United States Patent
Moriya

(10) Patent No.: US 8,374,769 B2
(45) Date of Patent: Feb. 12, 2013

(54) CONTROL APPARATUS AND CONTROL METHOD FOR VARIABLE VALVE OPERATING MECHANISM

(75) Inventor: Yoshihito Moriya, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 387 days.

(21) Appl. No.: 12/674,088

(22) PCT Filed: Feb. 12, 2009

(86) PCT No.: PCT/IB2009/000242
§ 371 (c)(1),
(2), (4) Date: Feb. 18, 2010

(87) PCT Pub. No.: WO2009/101508
PCT Pub. Date: Aug. 20, 2009

(65) Prior Publication Data
US 2011/0106406 A1    May 5, 2011

(30) Foreign Application Priority Data
Feb. 13, 2008  (JP) .................................. 2008-032305

(51) Int. Cl.
*B60T 7/12*    (2006.01)
*G05D 1/00*    (2006.01)
*G06F 7/00*    (2006.01)
*G06F 17/00*    (2006.01)
*F01L 1/34*    (2006.01)
(52) U.S. Cl. ..................................... 701/103; 123/90.15
(58) Field of Classification Search .............. 123/90.15, 123/90.16, 90.17, 198 F; 701/103, 105, 110
See application file for complete search history.

(56) References Cited

U.S. PATENT DOCUMENTS

| 5,628,286 A * | 5/1997 | Kato et al. ................. 123/90.15 |
| 7,469,672 B2 * | 12/2008 | Andri .......................... 123/198 F |
| 2005/0268880 A1 | 12/2005 | Bidner et al. |

FOREIGN PATENT DOCUMENTS

| JP | 5 163971 | 6/1993 |
| JP | 11-36905 | 2/1999 |
| JP | 2001-234792 | 8/2001 |
| JP | 2002-221052 | 8/2002 |
| JP | 2004-270596 | 9/2004 |

* cited by examiner

Primary Examiner — Stephen K Cronin
Assistant Examiner — Sherman Manley
(74) Attorney, Agent, or Firm — Oblon, Spivak, McClelland, Maier & Neustadt, L.L.P.

(57) ABSTRACT

A control apparatus and a control method for a variable valve operating mechanism are employed for a multi-cylinder internal combustion engine including the variable valve operating mechanism and a valve stop mechanism. The variable valve operating mechanism includes a variable mechanism portion that changes a valve characteristic of an engine valve, and an actuator that drives the variable mechanism portion. The valve stop mechanism stops opening/closing of the engine valve in at least one cylinder. A controlled variable for the actuator is set so that an actual value of the valve characteristic matches a target value. A control characteristic value used to set the controlled variable, and used to make the actual value match the target value, is set such that when a reduced-cylinder operation is performed, the control characteristic value is different from the control characteristic value when an all-cylinder operation is performed.

15 Claims, 5 Drawing Sheets

CONTROL APPARATUS AND CONTROL METHOD FOR VARIABLE VALVE OPERATING MECHANISM

BACKGROUND OF THE INVENTION

1. Field of the Invention

The invention relates to a control apparatus and a control method for a variable valve operating mechanism provided in a multi-cylinder internal combustion engine in which a reduced-cylinder operation can be performed.

2. Description of the Related Art

For example, Japanese Patent Application Publication No. 5-163971 (JP-A-5-163971) describes a multi-cylinder internal combustion engine that includes a variable valve operating mechanism and a valve stop mechanism. The variable valve operating mechanism includes a variable mechanism portion that changes the valve characteristic of an engine valve, for example, an intake valve and/or an exhaust valve, and an actuator that drives the variable mechanism portion. The valve stop mechanism stops the opening and closing of the engine valve in at least one of cylinders.

In the internal combustion engine, an output from the engine is improved, and properties of exhaust gas are improved by changing the valve characteristic of the engine valve using the variable valve operating mechanism. Also, for example, fuel efficiency is improved by performing a so-called reduced-cylinder operation. In the reduced-cylinder operation, the opening and closing of the engine valve (for example, the intake valve) in at least one of the cylinders is stopped using the valve stop mechanism, and thus, the at least one cylinder is deactivated.

When the actuator of the variable valve operating mechanism is controlled so that an actual value of the valve characteristic matches a target value of the valve characteristic set based on an engine operating state, control characteristic values are set. The control characteristic values are used to set a controlled variable for the actuator, and used to make the actual value of the valve characteristic match the target value of the valve characteristic.

The reaction force of a valve spring of the engine valve is transmitted to the variable valve operating mechanism through a cam of a camshaft. Thus, the reaction force of the valve spring transmitted to the variable valve operating mechanism in the above-described manner (hereinafter, referred to as "cam torque") influences the optimization of the control characteristic values.

For example, when the feedback control of the controlled variable for the actuator is executed according to the difference between the target value of the valve characteristic and the actual value of the valve characteristic, a change amount in the controlled variable for the actuator is calculated by multiplying the difference by a control gain, which is one of the control characteristic values. The change amount is an amount by which the controlled variable needs to be changed with respect to the controlled variable before the valve characteristic is changed. If the control gain is extremely small with respect to the cam torque, a drive speed, at which the actuator is driven, is decreased, and a response speed is decreased when the valve characteristic is changed. If the control gain is extremely large, the drive speed, at which the actuator is driven, is extremely high, and the actual value of the valve characteristic may overshoot the target value, or a hunting phenomenon, in which the actual value of the valve characteristic oscillates, may occur.

When the actual value of the valve characteristic is maintained at the target value, the controlled variable for the actuator is set to a maintenance value, which is one of the control characteristic values, and at which the actual value is maintained at the target value against the cam torque. If the maintenance value is extremely small with respect to the cam torque, the actual value of the valve characteristic is deviated from the target value in a direction in which the cam torque acts. Therefore, the actuator is driven to correct the deviation. As a result, the hunting phenomenon occurs, that is, the actual value of the valve characteristic oscillates near the target value. When the maintenance value is extremely large, the actual value of the valve characteristic is deviated from the target value in a direction opposite to the direction in which the cam torque acts. In this case as well, the actuator is driven to correct the deviation. As a result, the hunting phenomenon occurs, that is, the actual value of the valve characteristic oscillates near the target value.

When controlling the actuator that drives the variable valve operating mechanism, if the control characteristic values are not appropriately set, the response speed becomes excessively high or insufficient, or the actual value overshoots the target value or the hunting phenomenon, in which the actual value oscillates, occurs. This deteriorates performance of controlling the valve characteristic.

As described above, in the internal combustion engine in which at least one of the cylinders can be deactivated by stopping the opening and closing of the engine valve in the at least one cylinder, that is, in the internal combustion engine in which the so-called reduced-cylinder operation can be performed, when an all-cylinder operation is performed, all the engine valves are opened and closed, and thus all the valve springs generate the reaction force. On the other hand, when the reduced-cylinder operation is performed, the opening and closing of at least one engine valve is stopped, and thus, the reaction force generated by the valve springs is decreased according to the number of the engine valves whose opening and closing are stopped. Thus, the cam torque is changed when the operation of the engine is changed between the all-cylinder operation and the reduced-cylinder operation. Therefore, the control characteristic values need to be changed according to the change in the cam torque. However, in a control apparatus described in the above-described publication, the need of setting the control characteristic values according to the change in the cam torque is not taken into account. Therefore, when controlling the actuator of the variable valve mechanism provided in the multi-cylinder internal combustion engine in which the reduced-cylinder operation can be performed, further improvement needs to be made.

SUMMARY OF THE INVENTION

The invention provides a control apparatus and a control method for a variable valve operating mechanism, which optimize a control characteristic value used to set a controlled variable for an actuator of a variable valve operating mechanism provided in a multi-cylinder internal combustion engine in which an all-cylinder operation and a reduced-cylinder operation are performed, according to each of the all-cylinder operation and the reduced-cylinder operation, when controlling the actuator.

A first aspect of the invention relates to a control apparatus for a variable valve operating mechanism, which is employed for a multi-cylinder internal combustion engine including the variable valve operating mechanism and a valve stop mechanism. The variable valve operating mechanism includes a variable mechanism portion that changes a valve characteristic of an engine valve, and an actuator that drives the variable mechanism portion. The valve stop mechanism stops opening and closing of the engine valve in at least one of cylinders. The control apparatus sets a controlled variable for the actuator so that an actual value of the valve characteristic matches a target value of the valve characteristic. The control apparatus sets a control characteristic value that is used to set the controlled variable for the actuator, and that is used to make the actual value match the target value, in a manner such that when a reduced-cylinder operation is performed by operating the valve stop mechanism, the control characteristic value is different from the control characteristic value when an all-cylinder operation is performed by deactivating the valve stop mechanism.

With the configuration, the control characteristic value used to set the controlled variable for the actuator is set in a manner such that when the reduced-cylinder operation is performed, the control characteristic value is different from the control characteristic value when the all-cylinder operation is performed. Thus, it is possible to set the control characteristic value to appropriate values according to cam torque during the reduced-cylinder operation and the cam torque during the all-cylinder operation, respectively. Accordingly, when controlling the actuator of the variable valve operating mechanism provided in the multi-cylinder internal combustion engine in which the all-cylinder operation and the reduced-cylinder operation are performed, it is possible to optimize the control characteristic value used to set the controlled variable for the actuator, according to each of the all-cylinder operation and the reduced-cylinder operation.

In the above-described aspect, the control apparatus may execute a feedback control of the controlled variable for the actuator according to a difference between the target value and the actual value; and the control characteristic value may be a control gain used in the feedback control.

With the configuration, when the feedback control of the controlled variable for the actuator is executed according to the difference between the target value of the valve characteristic and the actual value of the valve characteristic, the control gain is set in a manner such that when the reduced-cylinder operation is performed, the control gain is different from the control gain when the all-cylinder operation is performed. Therefore, it is possible to set the control gain to appropriate values according to the cam torque during the reduced-cylinder operation and the cam torque during the all-cylinder operation, respectively.

When the reduced-cylinder operation is performed, the opening and closing of the engine valve in at least one of cylinders are stopped, and therefore, the cam torque is smaller than that when the all-cylinder operation is performed. Accordingly, when the reduced-cylinder operation is performed, the control gain may be smaller than the control gain when the all-cylinder operation is performed. With this configuration, it is possible to appropriately set the control gain during each of the all-cylinder operation and the reduced-cylinder operation.

In the above-described aspect, the control characteristic value may be a maintenance value that is set as the controlled variable for the actuator to maintain the actual value at the target value.

With the configuration, the maintenance value is set in a manner such that when the reduced-cylinder operation is performed, the maintenance value is different from the maintenance value when the all-cylinder operation is performed. Therefore, it is possible to set the maintenance value to appropriate values according to the cam torque during the reduced-cylinder operation and the cam torque during the all-cylinder operation, respectively.

As described above, when the reduced-cylinder operation is performed, the cam torque is smaller than that when the all-cylinder operation is performed. Accordingly, when the reduced-cylinder operation is performed, the maintenance value may be smaller than the maintenance value when the all-cylinder operation is performed. With the configuration, it is possible to appropriately set the maintenance value during each of the all-cylinder operation and the reduced-cylinder operation.

In the above-described aspect, the valve characteristic may be changed by setting the controlled variable so that the controlled variable is different from the maintenance value.

The maintenance value is used to maintain the actual value of the valve characteristic at the target value. The valve characteristic is changed by setting the controlled variable for the actuator so that the controlled variable is different from the maintenance value. In this regard, with the configuration, the maintenance value, which is used as the reference value for the variable control of the valve characteristic, is set to appropriate values according to the cam torque during the reduced-cylinder operation and the cam torque during the all-cylinder operation, respectively. Therefore, it is possible to appropriately execute the variable control of the valve characteristic during each of the all-cylinder operation and the reduced-cylinder operation.

In the above-described aspect, the control apparatus may execute a learning process in which the controlled variable for the actuator at a time at which the valve characteristic is changed and the actual value matches the target value is learned as a learned value, and the maintenance value is set to the learned value, during each of the reduced-cylinder operation and the all-cylinder operation; and the control apparatus may set an initial value of the maintenance value used before the learning process is completed, in a manner such that when the reduced-cylinder operation is performed, the initial value is different from the initial value when the all-cylinder operation is performed.

The maintenance value may be set to a fixed value that is set in advance. However, for example, because the cam torque varies, the maintenance value is set to a more reliable value according to the actual cam torque, when executing a learning process in which the controlled variable for the actuator at the time at which the valve characteristic is changed and the actual value matches the target value is learned as a learned value, and the maintenance value is set to the learned value. When the learning process is executed, the maintenance value cannot be left undetermined until the learning process is completed. Therefore, generally, the maintenance value is set to an initial value, and the maintenance value is changed from the initial value to the learned value when the learning process is completed. With the configuration, in the case where the process of learning the maintenance value is executed, the initial value is set in a manner such that when the reduced-cylinder operation is performed, the initial value is different from the initial value when the all-cylinder operation is performed. Thus, before the learning process is completed, the maintenance value is set to the initial value that is set in advance, and therefore, it is possible to set the maintenance value to appropriate values according to the cam torque during the reduced-cylinder operation and the cam torque during the all-cylinder operation, respectively.

The operation of the actuator may be controlled by executing a duty control, and the maintenance value may be a maintenance duty value used to maintain the actual value at the target value.

A second aspect of the invention relates to a control method for a variable valve operating mechanism, which is employed for a multi-cylinder internal combustion engine including the variable valve operating mechanism and a valve stop mechanism, wherein the variable valve operating mechanism includes a variable mechanism portion that changes a valve characteristic of an engine valve, and an actuator that drives the variable mechanism portion; and the valve stop mechanism stops opening and closing of the engine valve in at least one of cylinders. The control method includes determining whether a reduced-cylinder operation is performed by operating the valve stop mechanism, or an all-cylinder operation is performed by deactivating the valve stop mechanism; setting a control characteristic value to a first value when the all-cylinder operation is performed, and setting the control characteristic value to a second value that is different from the first value when the reduced-cylinder operation is performed, wherein the control characteristic value is used to set a controlled variable for the actuator, and used to make an actual value of the valve characteristic matches a target value of the valve characteristic; and setting the controlled variable for the actuator so that the actual value matches the target value, using the set control characteristic value.

A third aspect of the invention relates to a control apparatus for a variable valve operating mechanism, which is employed for a multi-cylinder internal combustion engine including the variable valve operating mechanism and a valve stop mechanism, wherein the variable valve operating mechanism includes a variable mechanism portion that changes a valve characteristic of an engine valve, and an actuator that drives the variable mechanism portion; and the valve stop mechanism stops opening and closing of the engine valve in at least one of cylinders. The control apparatus includes a controller that sets a controlled variable for the actuator so that an actual value of the valve characteristic matches a target value of the valve characteristic, and sets a control characteristic value that is used to set the controlled variable for the actuator, and that is used to make the actual value match the target value, in a manner such that when a reduced-cylinder operation is performed by operating the valve stop mechanism, the control characteristic value is different from the control characteristic value when an all-cylinder operation is performed by deactivating the valve stop mechanism.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
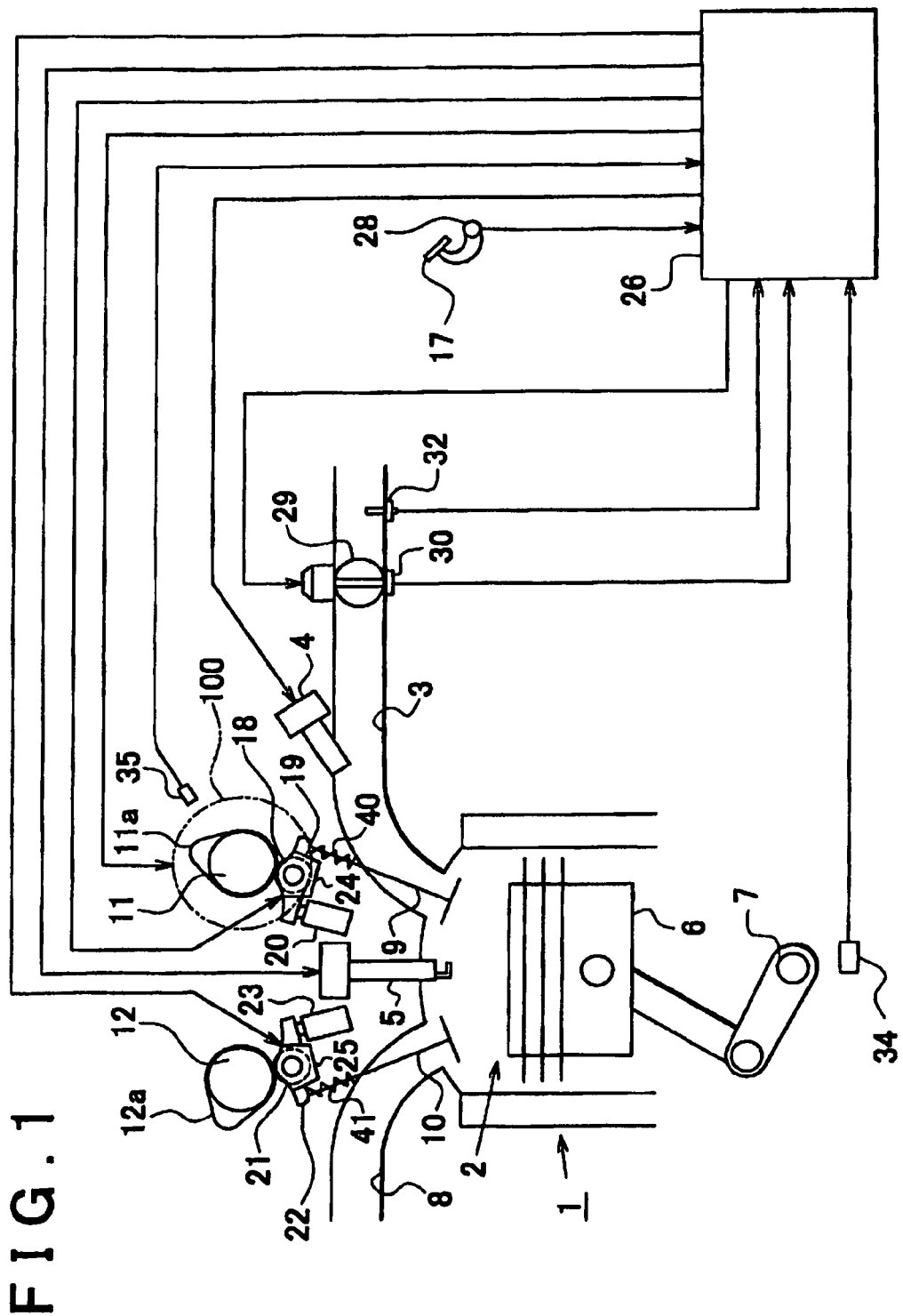
FIG. 1 is a schematic diagram showing an internal combustion engine to which a control apparatus for a variable valve operating mechanism according to an embodiment of the invention is applied, and a configuration around the internal combustion engine.

Hereinafter, a control apparatus for a variable valve operating mechanism according to an embodiment of the invention will be described with reference to FIG. 1 to FIG. 7. An engine 1 shown in FIG. 1 is a multi-cylinder internal combustion engine that includes a plurality of cylinders. In the engine 1, the opening amount of a throttle valve 29 provided in an intake passage 3 is adjusted based on, for example, the depression amount of an accelerator pedal 17 (i.e., an accelerator-pedal operation amount). Thus, air, whose amount is determined according to the opening amount of the throttle valve 29, is taken into a combustion chamber 2 of each cylinder through an intake passage 3. The fuel, whose amount is determined according to the amount of air taken into the engine 1, is injected from a fuel injection valve 4 to the intake passage 3 of the engine 1. As a result, an air-fuel mixture, which includes air and fuel, is generated in the combustion chamber 2 of each cylinder in the engine 1. When an ignition plug 5 ignites the air-fuel mixture, the air-fuel mixture is burned. As a result, a piston 6 is reciprocated, and accordingly, a crankshaft 7, which is an output shaft of the engine 1, is rotated. After the air-fuel mixture is burned, exhaust gas is discharged from each combustion chamber 2 to an exhaust passage 8.

In each cylinder of the engine 1, an intake valve 9 is opened and closed to allow and interrupt communication between the combustion chamber 2 and the intake passage 3, and an exhaust valve 10 is opened and closed to allow and interrupt communication between the combustion chamber 2 and the exhaust passage 8. The intake valve 9 and the exhaust valve 10 are opened and closed due to the rotation of an intake camshaft 11 and an exhaust camshaft 12, to which the rotation of the crankshaft 7 is transmitted. More specifically, an intake-side valve spring 40 urges the intake valve 9 in a direction to close the intake valve 9. A rocker arm 19, which includes a roller 18, is provided between an intake cam 11a fixed to the intake camshaft 11, and the intake valve 9. When the rotating intake cam 11a presses the roller 18, the rocker arm 19 oscillates around a contact point at which the rocker arm 19 contacts a lash adjuster 20. The rocker arm 19 supports one end of the lash adjuster 20. Accordingly, the rocker arm 19 presses the intake valve 9 against a reaction force of the intake-side valve spring 40. Thus, the intake valve 9 is opened and closed by the pressing force of the rocker arm 19 and the reaction force of the intake-side valve spring 40. An exhaust-side valve spring 41 urges the exhaust valve 10 in a direction to close the exhaust valve 10. A rocker arm 22, which includes a roller 21, is provided between an exhaust cam 12a fixed to the exhaust camshaft 12, and the exhaust valve 10. When the rotating exhaust cam 12a presses the rocker arm 22, the rocker arm 22 oscillates around a contact point at which the rocker arm 22 contacts a lash adjuster 23. The rocker arm 22 supports one end of the lash adjuster 23. Accordingly, the rocker arm 22 presses the exhaust valve 10 against the reaction force of the exhaust-side valve spring 41. Thus, the exhaust valve 10 is opened and closed by the pressing force of the rocker arm 22 and the reaction force of the exhaust-side valve spring 41.

In the above-described engine 1, an all-cylinder operation and a so-called reduced-cylinder operation are performed. In the all-cylinder operation, all of the cylinders are operated. In the reduced-cylinder operation, at least one of the cylinders is deactivated, and only the rest of the cylinders are operated, for example, to improve fuel efficiency. The reduced-cylinder operation is performed by stopping fuel injection from the fuel injection valve 4, stopping the supply of electric power to the ignition plug 5 for igniting the air-fuel mixture, and stopping the opening and closing of the intake valve 9 and the exhaust valve 10, in at least one of the cylinders in the engine 1. The opening and closing of the intake valve 9 and the exhaust valve 10 are stopped using valve stop mechanisms 24 and 25 provided in the rocker arms 19 and 22, respectively.

The valve stop mechanism 24, which is provided in the rocker arm 19 provided between the intake cam 11a and the intake valve 9, is able to stop the lift movement (opening/closing) of the intake valve 9 that is opened and closed when the intake cam 11a presses the rocker arm 19 (the roller 18).

When the valve stop mechanism 24 is operated, the roller 18 is movable relative to the rocker arm 19 in the direction in which the intake cam 11a presses the roller 18. When the valve stop mechanism 24 is not operated, the roller 18 is restricted from moving relative to the rocker arm 19. In the case where the valve stop mechanism 24 is not operated, because the roller 18 is restricted from moving relative to the rocker arm 19, when the intake cam 11a presses the roller 18, the rocker arm 19 accordingly oscillates as described above, and thus, the intake valve 9 is opened and closed. In contrast, in the case where the valve stop mechanism 24 is operated, because the roller 18 is movable relative to the rocker arm 19, when the intake cam 11a presses the roller 18, the roller 18 moves relative to the rocker arm 19. Thus, although the intake cam 11a presses the roller 18, the rocker arm 19 does not oscillate. As a result, the oscillation of the rocker arm 19 is stopped, and accordingly, the lift movement of the intake valve 9 due to the rotation of the intake cam 11a is stopped. Thus, the intake valve 9 is brought to a closed state.

The valve stop mechanism 25, which is provided in the rocker arm 22 provided between the exhaust cam 12a and the exhaust valve 10, is able to stop the lift movement (opening/closing) of the exhaust valve 10 that is opened and closed when the exhaust cam 12a presses the rocker arm 22 (the roller 21).

The valve stop mechanism 25 has the same structure as that of the valve stop mechanism 24. When the valve stop mechanism 25 is operated, the roller 21 is movable relative to the rocker arm 22 in a direction in which the exhaust cam 12a presses the roller 21. When the valve stop mechanism 25 is not operated, the roller 21 is restricted from moving relative to the rocker arm 22. In the case where the valve stop mechanism 25 is not operated, because the roller 21 is restricted from moving relative to the rocker arm 22, when the exhaust cam 12a presses the roller 21, the rocker arm 22 accordingly oscillates as described above, and thus, the exhaust valve 10 is opened and closed. In contrast, in the case where the valve stop mechanism 25 is operated, because the roller 21 is movable relative to the rocker arm 22, when the exhaust cam 12a presses the roller 21, the roller 21 moves relative to the rocker arm 22. Thus, although the exhaust cam 12a presses the roller 21, the rocker arm 22 does not oscillate. As a result, the oscillation of the rocker arm 22 is stopped, and accordingly, the lift movement of the exhaust valve 10 due to the rotation of the exhaust cam 12a is stopped. Thus, the exhaust valve 10 is also brought to a closed state.

The engine 1 is provided with a variable valve operating mechanism 100 that continuously changes the valve characteristics of the intake valve 9, which is one of engine valves such as the intake valve 9 and the exhaust valve 10. The variable valve operating mechanism 100 changes the valve timing of the intake valve 9 by changing the rotational phase of the intake camshaft 11 relative to the crankshaft 7. The valve characteristics of the intake valve 9 are changed to appropriate values according to an engine operating state, by advancing or retarding both of an opening timing and a closing timing of the intake valve 9 while a valve-open period, in which the intake valve 9 is open, is maintained at a constant value, through the operation of the variable valve operating mechanism 100.

Figure 2:
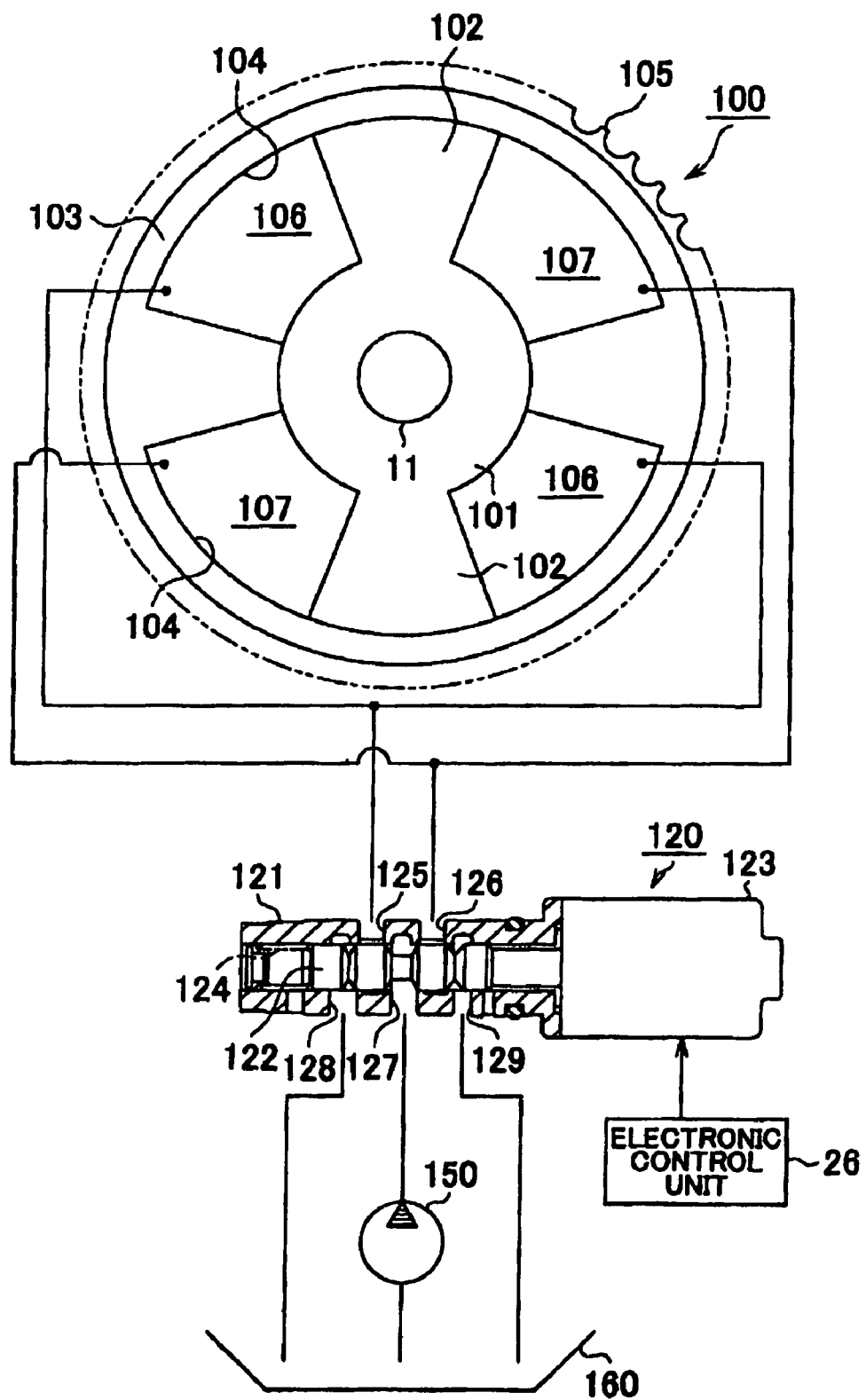
FIG. 2 is a schematic diagram showing the structure of the variable valve operating mechanism according to the embodiment.

FIG. 2 schematically shows the structure of the variable valve operating mechanism 100. As shown in FIG. 2, the variable valve operating mechanism 100 includes a housing 103 that has substantially circular ring shape, and a rotor 101 housed in the housing 103. The rotor 101 is connected to the intake camshaft 11 that opens/closes the intake valve 9 in a manner such that the rotor 101 and the intake camshaft 11 rotate integrally with each other. The housing 103 is connected to a cam pulley 105 that is rotated in synchronization with the crankshaft 7 in a manner such that the housing 103 and the cam pulley 105 rotate integrally with each other.

In the housing 103, a plurality of timing-advancing pressure chambers 106 and a plurality of timing-retarding pressure chambers 107 are formed. The timing-advancing pressure chambers 106 and the timing-retarding pressure chamber 107 are defined by the inner peripheral surface of the housing 103, and vanes 102 provided in the rotor 101. The number of the timing-advancing pressure chambers 106 and the number of the timing-retarding pressure chamber 107 may be appropriately changed.

Each of the timing-advancing pressure chambers 106 and the timing-retarding pressure chambers 107 is connected to a hydraulic pressure control valve 120 via an appropriate hydraulic passage. The hydraulic pressure control valve 120 includes a sleeve 121, a spool 122, a solenoid 123, and a spring 124. Ports are formed in the sleeve 121. The spool 122, which serves as a valve element, is housed in the sleeve 121 in a manner such that the spool 122 is reciprocated. The solenoid 123 and the spring 124 reciprocate the spool 122.

A timing-advancing port 125 connected to the timing-advancing pressure chambers 106, a timing-retarding port 126 connected to the timing-retarding chambers 107, a pump port 127 connected to an oil pump 150, drain ports 128 and 129 connected to the oil pan 160 are formed in the sleeve 121. By changing the position of a valve element provided in the spool 122, the hydraulic pressure is supplied to the timing-advancing pressure chambers 106, the hydraulic pressure is supplied to the timing-retarding pressure chambers 107, or the hydraulic pressures in the timing-advancing pressure chambers 106 and the timing-retarding pressure chambers 107 are maintained. The position of the spool 122 is set by the duty factor of a chive voltage signal applied to the solenoid 123.

For example, when the duty factor is equal to or larger than 0% and smaller than 50% (0%≦duty factor<50%), the spool 122 is moved so that communication is provided between the pump port 127 and the timing-retarding port 126, and communication is provided between the drain port 128 and the timing-advancing port 125. Thus, the hydraulic pressure is supplied to the timing-retarding pressure chambers 107, and the rotor 101 is rotated to retard the valve timing. As a result, the valve timing is retarded. When the duty factor is larger than 50% and equal to or smaller than 100% (50%<duty factor≦100%), the spool 122 is moved so that communication is provided between the pump port 127 and the timing-advancing port 125 and communication is provided between the drain port 129 and the timing-retarding port 126. Thus, the hydraulic pressure is supplied to the timing-advancing pressure chambers 106, and the rotor 101 is rotated to advance the valve timing. As a result, the valve timing is advanced. When the duty factor is near 50%, the spool 122 is moved to a neutral position so that both of the timing-advancing port 125 and the timing-retarding port 126 are closed. Thus, the hydraulic pressures in the timing-advancing pressure chambers 106 and the timing-retarding pressure chambers 107 are maintained. As a result, basically, the current valve timing is maintained.

Thus, the variable valve operating mechanism 100 includes a variable mechanism portion and the hydraulic pressure control valve 120. The variable mechanism portion includes the rotor 101, the vanes 102, and the housing 103, and changes the valve characteristics. The hydraulic pressure control valve 120 functions as an actuator that drives the variable mechanism portion. When the variable valve operating mechanism 100 changes the valve timing of the intake valve 9, both of the opening timing and the closing timing of the intake valve 9 are advanced by the same crank angle, or retarded by the same crank angle. That is, the opening timing and the closing timing of the intake valve 9 are advanced or retarded while the valve-open period, in which the intake valve 9 is open, is maintained at a constant value.

As shown in FIG. 1, for example, the operating state of the engine 1 is detected using sensors. For example, an accelerator position sensor 28 detects the depression amount of the accelerator pedal 17 depressed by a driver of a vehicle (i.e., the accelerator-pedal operation amount). A throttle position sensor 30 detects the opening amount of the throttle valve 29 provided in the intake passage 3 (i.e., the throttle-valve opening amount). An airflow meter 32 detects the amount of air taken into the combustion chamber 2 through the intake passage 3 (i.e., an intake air amount). A crank position sensor 34 detects the rotational angle of the crankshaft 7, that is, a crank angle. An engine speed is calculated based on the signal indicating the detected crank angle. A cam angle sensor 35 provided near the intake camshaft 11 detects the rotational phase of the intake camshaft 11. An actual displacement angle VT of the intake camshaft 11, which indicates the actual valve timing of the intake valve 9, is calculated based on values detected by the cam angle sensor 35 and the crank position sensor 34.

An electronic control unit 26 executes controls for the engine 1. The electronic control unit 26 includes a CPU, a ROM, a RAM, and input/output ports. The CPU executes calculation processes relating to the above-described controls. Programs and data required to execute the controls are stored in the ROM. The results of the calculations performed by the CPU are temporarily stored in the RAM. Signals are input from the outside to the electronic control unit 26, and signals are output from the electronic control unit 26 to the outside through the input/output ports. Signal lines of the sensors are connected to the input port. For example, drive circuits for the fuel injection valve 4, the ignition plug 5, the hydraulic pressure control valve 120 of the variable valve operating mechanism 100, the throttle valve 29, and the valve stop mechanisms 24 and 25 are connected to the output port. The electronic control unit 26 outputs command signals to the above-described drive circuits connected to the output port, according to the engine operating state detected by the sensors. Thus, the electronic control unit 26 executes a fuel injection control for the fuel injection valve 4, an ignition timing control for the ignition plug 5, a valve timing control for the intake valve 9, an opening amount control for the throttle valve 29, and drive controls for the valve stop mechanisms 24 and 25.

Figure 3:
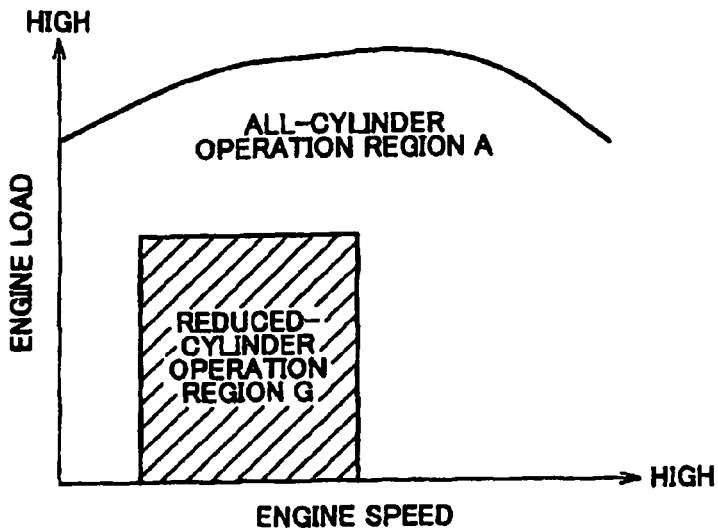
FIG. 3 is a conceptual diagram showing an all-cylinder operation region and a reduced-cylinder operation region according to the embodiment.
Figure 4:
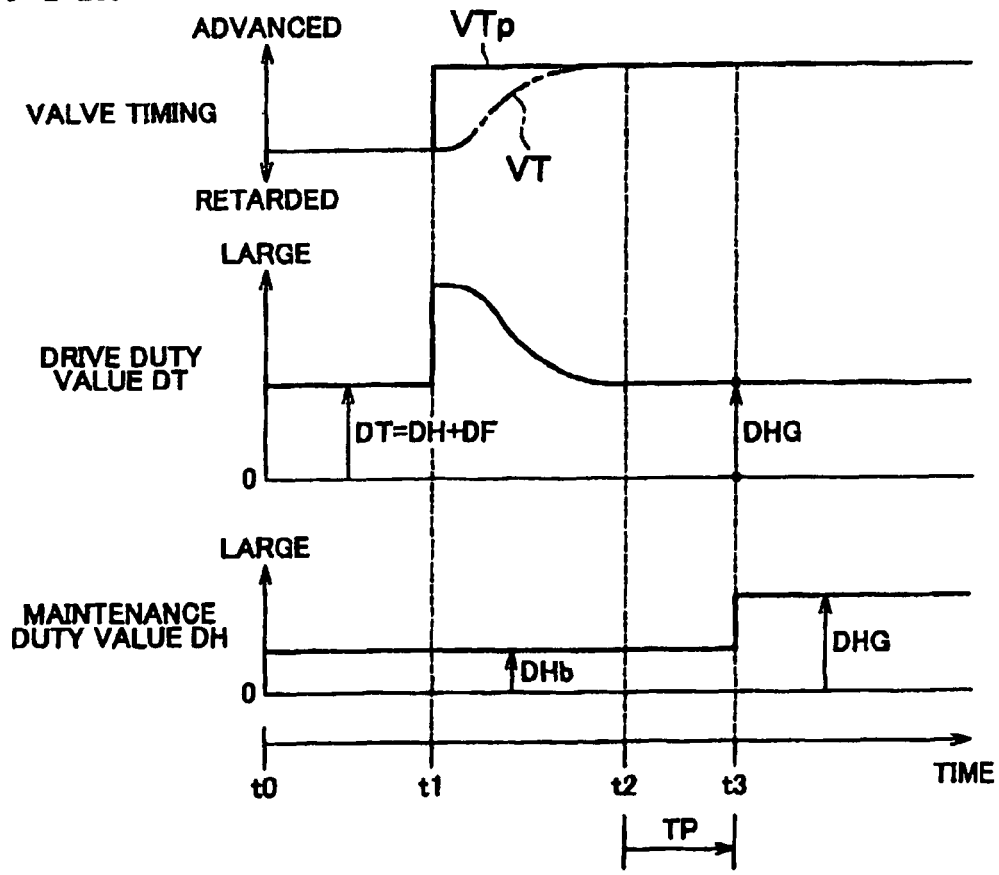
FIG. 4 is a timing chart showing a manner in which a maintenance duty value is learned according to the embodiment.

The operation of the engine 1 is changed between the reduced-cylinder operation and the all-cylinder operation, according to the engine operating state. That is, as shown in FIG. 3, when the engine operating state determined based on the engine speed and an engine load is a low-speed low-load state, and the engine operating state is in a preset reduced-cylinder operation region G, the reduced-cylinder operation is performed. If the reduced-cylinder operation is performed when the engine operating state is in an extremely low speed region, torque output from the engine 1 significantly fluctuates. Therefore, in the embodiment, the extremely low speed region is excluded from the reduced-cylinder operation region G.

When the reduced-cylinder operation is performed, the fuel injection from the fuel injection valve 4 is stopped and the ignition performed by the ignition plug 5 is stopped in at least one of the cylinders. In addition, the opening/closing of the intake valve 9 and the opening/closing of the exhaust valve 10 are stopped by the operation of the valve stop mechanisms 24 and 25 in the at least one of the cylinders in which the fuel injection and the ignition are stopped. Thus, when the engine operating state is in the low-speed low-load region, that is, when the amount of air (air-fuel mixture) taken into each operating cylinder in one cycle is decreased, the reduced-cylinder operation is performed so that at least one of the cylinders is deactivated. Accordingly, the amount of air (air-fuel mixture) taken into each of the rest of the cylinders (i.e., each operating cylinder) in one cycle is increased. As a result, the amount of air (air-fuel mixture) taken into each operating cylinder in one cycle when the reduced-cylinder operation is performed is close to the amount of air (air-fuel mixture) taken into each operating cylinder in one cycle when the all-cylinder operation is performed, and the engine is in the high-load operating state. This improves the fuel efficiency of the engine 1 when the engine 1 is in the low-load operating state.

When the engine operating state is in a region outside the reduced-cylinder operation region G, in other words, when the engine operating state is in an all-cylinder operation region A, the all-cylinder operation is performed. When the all-cylinder operation is performed, the fuel is injected from the fuel injection valve 4, and the ignition plug 5 ignites the air-fuel mixture in each of all the cylinders. In addition, the valve stop mechanisms 24 and 25 are deactivated, and thus, all the intake valves 9 and the exhaust valves 10 are opened and closed.

In the valve timing control for the intake valve 9, the above-described actual displacement angle VT is defined as an amount by which the rotational phase of the intake camshaft 11 is advanced from a reference rotational phase at which the rotor 101 of the variable valve operating mechanism 100 is at the most retarded position, and the valve timing is most retarded. The valve timing of the intake valve 9 is changed according to the engine operating state by executing the feedback control of the operation of the hydraulic pressure control valve 120 so that the actual displacement angle VT matches a target displacement angle VTp set based on the engine operating state. More specifically, a drive duty value DT, which is a controlled variable for the hydraulic pressure control valve 120, is calculated according to Equation 1 described below.

Equation 1 The drive duty value DT=a maintenance duty value DH+a feedback value DF. In the Equation 1, the feedback value DF is a duty factor set according to a difference $\Delta VT$ between the target displacement angle VTp and the actual displacement angle VT ($\Delta VT=VTp-VT$). As shown by Equation 2 described below, the feedback value DF is the sum of a proportional term (a proportional gain P (@ $\Delta VT$)), an integral term (an integral gain I (@ a cumulative value of ΔVT)), and a differential term (a differential gain D (@ an amount of change in ΔVT)) in the feedback control.

Equation 2 The feedback value DF=P (@ ΔVT)+I (@ the cumulative value of ΔVT)+D (@ the amount of change in ΔVT). In the Equation 2, P is the proportional gain, I is the integral gain, and D is the differential gain. The proportional gain P, the integral gain I, and the differential gain D are control characteristic values set in advance to make the actual displacement angle VT match the target displacement angle VTp in the feedback control. Basically, as the absolute values of the control characteristic values increase, the drive speed, at which the hydraulic pressure control valve 120 is driven, is increased, and the time required for the actual displacement angle VT to reach the target displacement angle VTp is decreased. However, if the control characteristic values are set so that the absolute values of the control characteristic values are extremely large values, the actual displacement angle VT may overshoot the target displacement angle VTp, or a hunting phenomenon, in which the actual displacement angle VT oscillates, may occur. Therefore, the control gains are set to appropriate values taking into account a response speed when the valve timing is changed, and the possibility that the actual displacement angle VT may overshoot the target displacement angle VTp, or the hunting phenomenon, in which the actual displacement angle VT oscillates, may occur.

The maintenance duty value DH is the control characteristic value used to make the actual displacement angle VT match the target displacement angle VTp. More specifically, the maintenance duty value DH is a maintenance value set as the controlled variable for the hydraulic pressure control valve 120 to maintain the actual displacement angle VT at the target displacement angle VTp. Basically, the actual displacement angle VT should be maintained at the target displacement angle VTp by controlling the position of the spool 122 to close both of the timing-advancing port 125 and the timing-retarding port 126, thereby maintaining the hydraulic pressures in the timing-advancing pressure chambers 106 and the timing-retarding pressure chambers 107. However, in reality, because a small amount of hydraulic oil leaks from the timing-advancing pressure chambers 106 and the timing-retarding pressure chambers 107, a hydraulic pressure needs to be supplied to such an extent that the leak of the hydraulic oil is compensated for, to maintain the actual displacement angle VT at the target displacement angle VTp. The reaction force of the intake-side valve spring 40 is transmitted to the variable valve operating mechanism 100 through the rocker arm 19, the intake cam 11a, and the intake camshaft 11. Therefore, the cam torque, which is transmitted to the variable valve operating mechanism 100 due to the reaction force of the intake-side valve spring 40, acts in a direction to retard the valve timing of the intake valve 9. Accordingly, when the hydraulic pressure is supplied to compensate for the leak of the hydraulic oil, the maintenance duty value DH is set to a duty factor at which the spool 122 is placed at a slightly more advanced position than the neutral position so that the hydraulic pressure is supplied to the timing-advancing pressure chambers 106.

The maintenance duty value DH may be a fixed value that is set in advance. However, because the above-described cam torque varies, the maintenance duty value DH is set to a more reliable value according to the actual cam torque, when executing a learning process in which the drive duty value DT at the time at which the valve timing is changed and the actual displacement angle VT matches the target displacement angle VTp is learned as a learned value, and the maintenance duty value DH is set to the learned value. When the learning process is executed, the maintenance duty value DH cannot be left undetermined until the learning process is completed. Therefore, it is conceivable that the maintenance duty value DH is set to an initial maintenance value DHb, and the maintenance duty value DH is changed from the initial maintenance value DHb to the learned value when the learning process is completed. In view of this, in the embodiment, the electronic control unit 26 executes the process of learning the maintenance duty value DH in the manner shown by FIG. 4.

First, when there is no history of learning of the maintenance duty value DH, the maintenance duty value DH is set to the initial maintenance value DHb (time point t0 to time point t3). The valve timing starts to change (time point t1). When the actual displacement angle VT matches the target displacement angle VTp (time point t2), a timer T starts measurement. The timer T indicates an elapsed time after the actual displacement angle VT matches the target displacement angle VTp. When the difference ΔVT between the target displacement angle VTp and the actual displacement angle VT exceeds a predetermined value, the timer T stops measurement, and the value of the timer T is reset. When the value of the timer T exceeds a preset determination time TP (time point t3), it is determined that the actual displacement angle VT stably matches the target displacement angle VTp, and the drive duty value DT at time point t3 is learned as a learned value DHG, and the maintenance duty value DH is set to the learned value DHG. Thus, at time point t3, the maintenance duty value DH is changed from the initial maintenance value DHb to the learned value DHG. The process of learning the maintenance duty value DH is executed during each of the all-cylinder operation and the reduced-cylinder operation. Thus, the maintenance duty value DH is learned during each of the all-cylinder operation and the reduced-cylinder operation.

The maintenance duty value DH is used to maintain the actual displacement angle VT at the target displacement angle VTp. The valve timing is changed by setting the drive duty value DT, which is the controlled variable for the hydraulic pressure control valve 120, so that the drive duty value DT is different from the maintenance duty value DH. That is, as shown by the above-described Equation 1, the drive duty value DT is made larger than the maintenance duty value DH, and the actual displacement angle VT is advanced by adding the feedback value DF to the maintenance duty value DH. On the other hand, the drive duty value DT is made smaller than the maintenance duty value DH, and the actual displacement angle VT is retarded by subtracting the feedback value DF from the maintenance duty value DH. Thus, the maintenance duty value DH is used as a reference value when the variable valve timing control is executed.

When the absolute values of the control gains are extremely small with respect to the cam torque, the drive speed, at which the hydraulic pressure control valve 120 is driven, is decreased, and the response speed relating to the change of the valve timing is decreased. On the other hand, when the absolute values of the control gains are extremely large with respect to the cam torque, the drive speed, at which the hydraulic pressure control valve 120 is driven, is made extremely high. As a result, the actual displacement angle VT may overshoot the target displacement angle VTp, or the hunting phenomenon, in which the actual displacement angle VT oscillates, may occur.

The initial maintenance value DHb, to which the maintenance duty value DH is sot before the learning process is completed, is set as the controlled variable for the hydraulic pressure control valve 120, which maintains the actual displacement angle VT at the target displacement angle VTp against the cam torque. When the initial maintenance value DHb is extremely small with respect to the cam torque, the actual displacement angle VT is deviated from the target displacement angle VTp in the direction in which the cam torque acts. More specifically, the actual displacement angle VT is deviated from the target displacement angle VTp so that the actual displacement angle VT is retarded. The feedback control of the hydraulic pressure control valve 120 is executed to correct the deviation. Accordingly, in this case, the hunting phenomenon occurs, that is, the actual displacement angle VT oscillates near the target displacement angle VTp. On the other hand, when the initial maintenance value DHb is extremely large with respect to the cam torque, the actual displacement angle VT is deviated from the target &placement angle VTp in a direction opposite to the direction in which the cam torque acts. More specifically, the actual displacement angle VT is deviated from the target displacement angle VTp so that the actual displacement angle VT is advanced. The feedback control of the hydraulic pressure control valve 120 is executed to correct the deviation. Accordingly, in this case as well, the hunting phenomenon occurs, that is, the actual displacement angle VT oscillates around the target displacement angle VTp.

Thus, when the hydraulic pressure control valve 120, which drives the variable valve operating mechanism 100, is controlled, if the control characteristic values, such as the control gains and the initial maintenance value DHb of the maintenance duty value DH, are not appropriately set according to the cam torque, the response speed becomes excessively high or insufficient, the actual displacement angle VT overshoots the target displacement angle VTp, or the hunting phenomenon, in which the actual displacement angle VT oscillates, occurs. This deteriorates the performance of controlling the valve timing.

When the all-cylinder operation of the engine 1 is performed, all the intake valves 9 and all the exhaust valves 10 are opened and dosed. Thus, all the valve springs generate the reaction force. On the Other band, when the reduced-cylinder operation of the engine 1 is performed, the opening and closing of the intake valve 9 and the opening and closing of the exhaust valve 10 are stopped in at least one of the cylinders, and accordingly, the reaction force generated by the valve springs is decreased according to the number of the engine valves whose opening and closing are stopped. Thus, the cam torque acting on the variable valve operating mechanism 100 during the reduced-cylinder operation is smaller than that during the all-cylinder operation. Because the cam torque acting on the variable valve operating mechanism 100 is changed when the operation of the engine 1 is changed between the all-cylinder operation and the reduced-cylinder operation, it is necessary to change the above-described control characteristic values according to the change in the cam torque.

Accordingly, in the embodiment, the proportional gain P and the initial maintenance value DHb of the maintenance duty value DH among the control characteristic values are set in a manner such that when the reduced-cylinder operation is performed, the proportional gain P and the initial maintenance value DHb are different from the proportional gain P and the initial maintenance value DHb when the all-cylinder operation is performed. Thus, when controlling the hydraulic pressure control valve 120 of the variable valve operating mechanism 100 provided in the engine 1 in which the all-cylinder operation and the reduced-cylinder operation are performed, the control characteristic values used to set the drive duty value DT, which is the controlled variable for the hydraulic pressure control valve 120, are optimized according to each of the all-cylinder operation and the reduced-cylinder operation.

Figure 5:
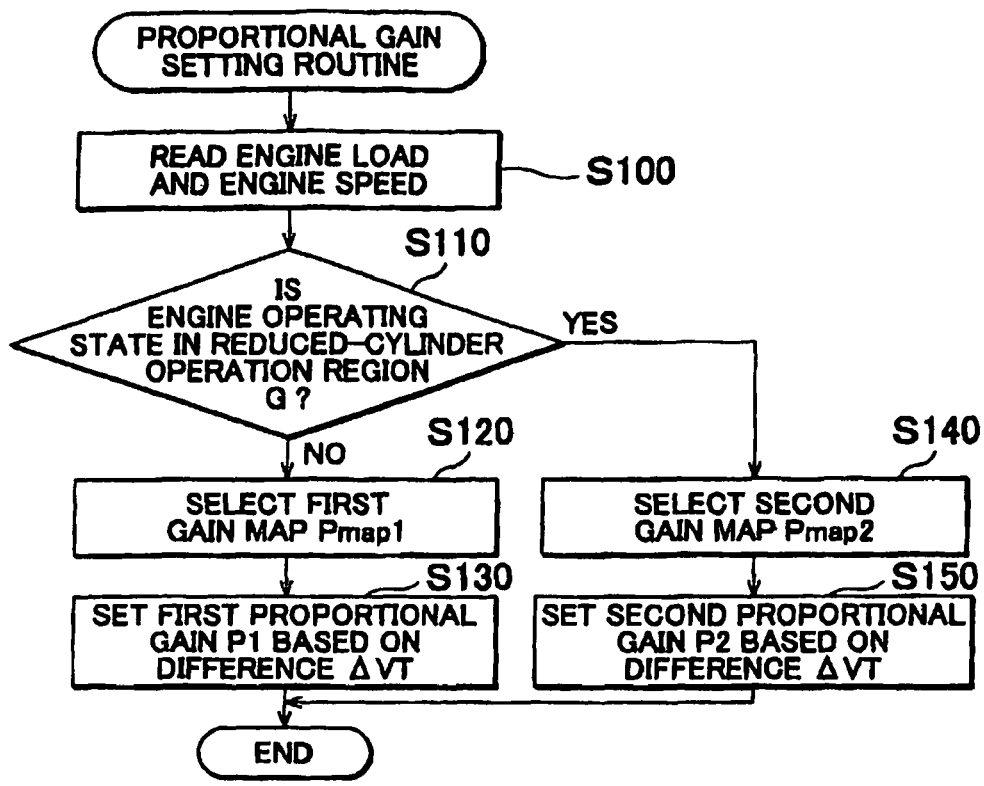
FIG. 5 is a flowchart showing steps of a routine for setting a proportional gain according to the embodiment.
Figure 7:
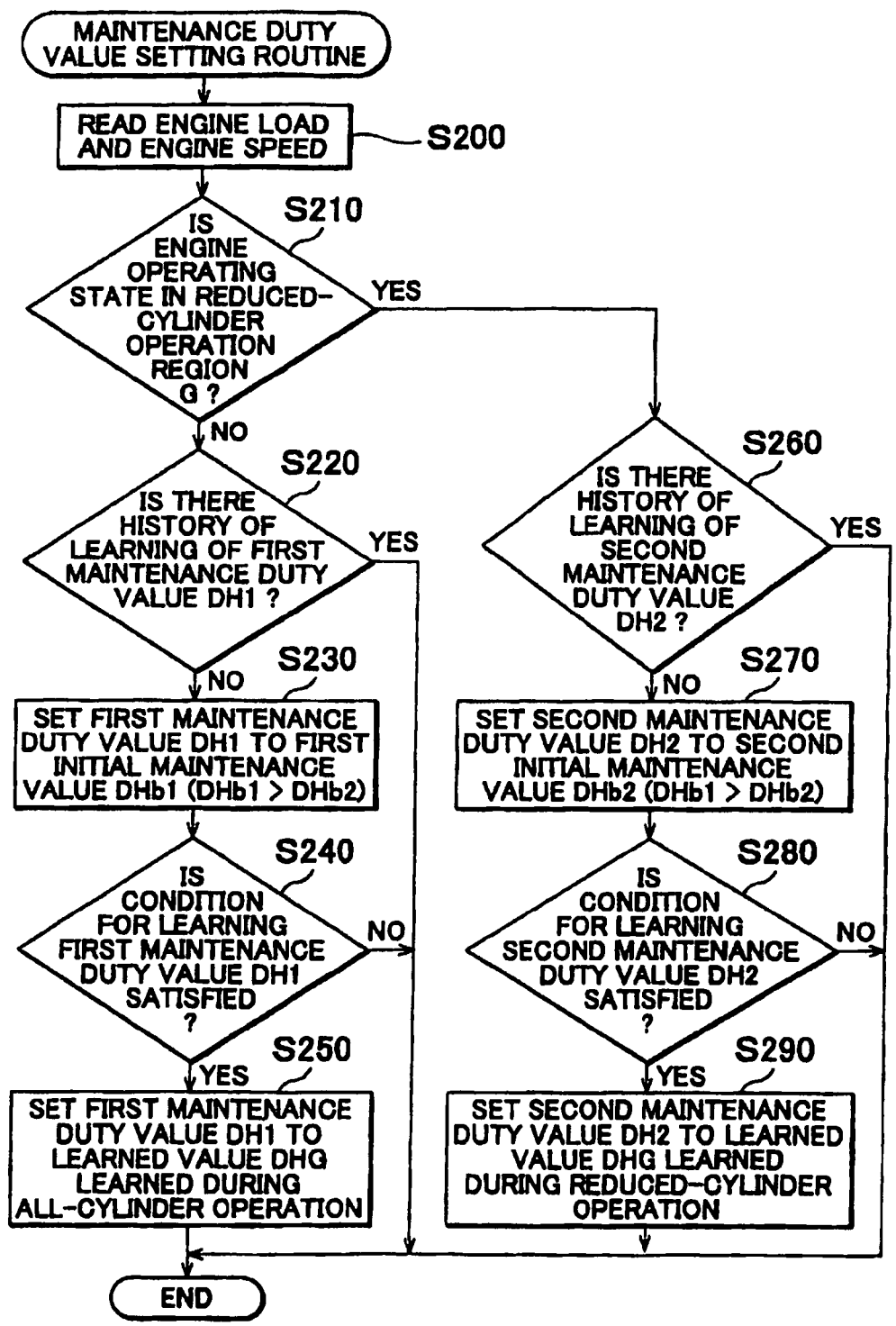
FIG. 7 is a flowchart showing steps of a routine for setting a maintenance duty value according to the embodiment

FIG. 5 shows steps of a routine for setting the proportional gain. FIG. 7 shows steps of a routine for setting the maintenance duty value. The electronic control unit 26 repeatedly executes the routine for setting the proportional gain (hereinafter, referred to as "proportional gain setting routine") and the routine for setting the maintenance duty value (hereinafter, referred to as "maintenance duty value setting routine") at predetermined time intervals.

First, the proportional gain setting routine will be described with reference to FIG. 5. When the routine is started, first, the current engine load and the current engine speed are read (S100). It is determined whether the current engine operating state is in the reduced-cylinder operation region G, based on the engine load and the engine speed (S110).

When it is determined that the engine operating state is not in the reduced-cylinder operation region G, that is, it is determined that the engine operating state is in the all-cylinder operation region A (NO in step S110), a first gain map Pmap1, which is used to set a first proportional gain P1, is selected (S120). The first proportional gain P1 is the proportional gain P appropriate for the all-cylinder operation. When it is determined that the engine operating state is in the reduced-cylinder operation region G (YES in step S110), a second gain map Pmap2, which is used to set a second proportional gain P2, is selected (S140). The second proportional gain P2 is the proportional gain P appropriate for the reduced-cylinder operation.

Figure 6:
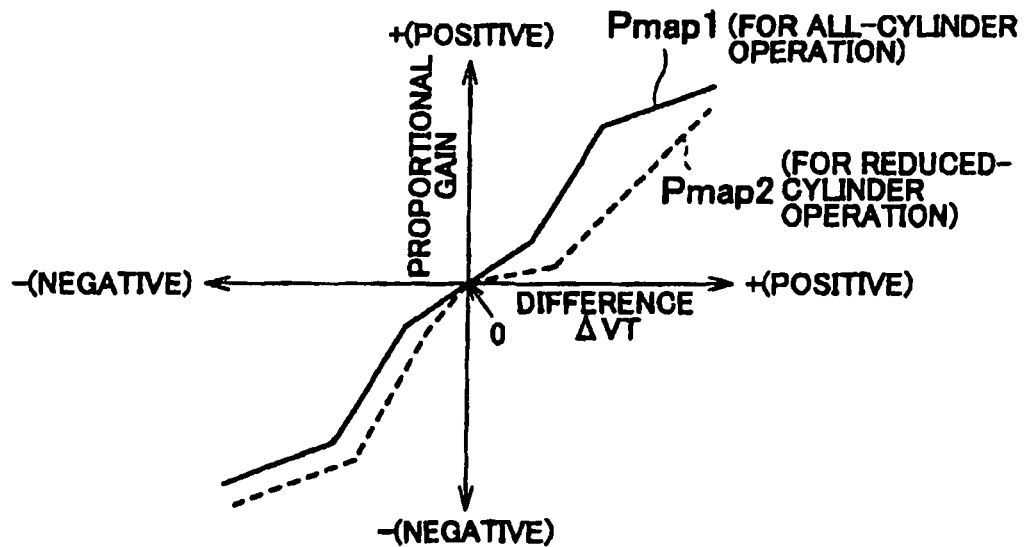
FIG. 6 is a graph showing a manner in which a first proportional gain and a second proportional gain are set according to the embodiment.

The first gain map Pmap1 and the second gain map Pmap2 are stored in the ROM of the electronic control unit 26. The first gain map Pmap1 and the second gain map Pmap2 are used to variably set the first proportional gain P1 and the second proportional gain P2, respectively, according to the difference ΔVT between the target displacement angle VTp the actual displacement angle VT. FIG. 6 shows the manner in which the first gain map Pmap1 and the second gain map Pmap2 are set. In FIG. 6, the solid line indicates the manner in which the first gain map Pmap1 is set, and the dashed line indicates the manner in which the second gain map Pmap2 is set.

As shown in FIG. 6, when the difference ΔVT is "0", both of the first proportional gain P1 and the second proportional gain P2 are set to "0". In the case where the difference ΔVT is a positive value, as the absolute value of the difference ΔVT increases, the absolute values of the first proportional gain P1 and the second proportional gain P2, which are positive values, increase. Accordingly, as the actual displacement angle VT needs to be advanced to reach the target displacement angle VTp by a larger value, the feedback value, which is a positive value, becomes larger, and the drive duty value DT becomes larger than the maintenance duty value DH by a larger value. Thus, the actual displacement angle VT is quickly advanced to the target displacement angle VTp.

In the case where the difference ΔVT is a negative value, as the absolute value of the difference ΔVT increases, the absolute values of the first proportional gain P1 and the second proportional gain P2, which are negative values, increase. Accordingly, as the actual displacement angle VT needs to be retarded to reach the target displacement angle VTp by a larger value, the drive duty value DT becomes smaller than the maintenance duty value DH by a larger value. Thus, the actual displacement angle VT is quickly retarded to the target displacement angle VTp.

As described above, when the reduced-cylinder operation is performed, the cam torque acting on the variable valve operating mechanism 100 is smaller than that when the all-cylinder operation is performed. Accordingly, taking into account the decrease in the cam torque, the optimum second proportional gain P2, which is the proportional gain P for the reduced-cylinder operation, is smaller than the first proportional gain P1, which is the proportional gain P for the all-cylinder operation. Thus, as shown in FIG. 6, each map is set in a manner such that when the difference ΔVT is the same, the second proportional gain P2 set by the second gain map Pmap2 is smaller than the first proportional gain P1 set by the first gain map Pmap1.

When the first gain map Pmap1, which is set in the above-described manner, is selected (S120), the first proportional gain P1 is set based on the current difference ΔVT (S130), and then, the routine ends. When the second gain map Pmap2, which is set in the above-described manner, is selected (S140), the second proportional gain P2 is set based on the current difference ΔVT (S150), and then, the routine ends.

By executing the proportional gain setting routine, the proportional gain P is set to appropriate values according to the cam torque during the reduced-cylinder operation, and the cam torque during the all-cylinder operation, respectively. Thus, when executing the feedback control of the hydraulic pressure control valve 120 of the variable valve operating mechanism 100 provided in the engine 1 in which the all-cylinder operation and the reduced-cylinder operation are performed, the proportional gain P, which is the control characteristic value used to set the controlled variable for the hydraulic pressure control valve 120, is optimized according to each of the all-cylinder operation and the reduced-cylinder operation. Thus, because the proportional gain P is set to appropriate values according to the all-cylinder operation and the reduced-cylinder operation, respectively, it is possible to suppress deterioration of the control performance when the valve timing is changed, during each of the all-cylinder operation and the reduced-cylinder operation. That is, it is possible to reduce the possibility that the response speed becomes excessively high or insufficient, the actual displacement angle VT overshoots the target displacement angle VTp, or the hunting phenomenon, in which the actual displacement angle VT oscillates, occurs, during each of the all-cylinder operation and the reduced-cylinder operation.

Next, the maintenance duty value setting routine will be described with reference to FIG. 7. When the routine is started, first, the current engine load and the current engine speed are read (S200). It is determined whether the current engine operating state is in the reduced-cylinder operation region G, based on the engine load and the engine speed (S210).

When it is determined that the engine operating state is not in the reduced-cylinder operation region G, that is, it is determined that the engine operating state is in the all-cylinder operation region A (NO in step S210), it is determined whether there is a history of learning of a first maintenance duty value DH1, which is the maintenance duty value DH appropriate for the all-cylinder operation (S220). When it is determined that there is a history of learning of the first maintenance duty value DH1 (YES in step S220), it is determined that the process of learning the maintenance duty value DH has already been executed during the all-cylinder operation, and the learning of the first maintenance duty value DH1 is completed. Thus, the routine ends.

When it is determined that there is no history of learning of the first maintenance duty value DH1 (NO in step S220), it is determined that the learning of the first maintenance duty value DH1 has not been performed, and the first maintenance duty value DH1 is set to a first initial maintenance value DHb1 that is the initial maintenance value DHb appropriate for the all-cylinder operation (S230). The first initial maintenance value DHb1 is set to a value larger than a second initial maintenance value DHb2 described later.

Next, it is determined whether a condition for learning the first maintenance duty value DH1 is satisfied (S240). The learning condition is a condition for permitting a change of the first maintenance duty value DH1 from the first initial maintenance value DHb1 to the learned value DHG during the process of learning the maintenance duty value DH. When the value of the timer T exceeds the determination time TP, an affirmative determination is made.

When it is determined that the condition for learning the first maintenance duty value DH1 is not satisfied (NO in step S240), the routine ends. In this case, the first maintenance duty value DH1 is maintained at the first initial maintenance value DHb1.

When it is determined that the condition for learning the first maintenance duty value DH1 is satisfied (YES in step S240), the first maintenance duty value DH1 is changed from the first initial maintenance value DHb1 to the learned value DHG learned during the all-cylinder operation (S250). Then, the routine ends.

When it is determined that the engine operating state is in the reduced-cylinder operation region G in step S210 (YES in step S210), it is determined whether there is a history of learning of a second maintenance duty value DH2, which is the maintenance duty value DH appropriate for the reduced-cylinder operation (S260). When it is determined that there is a history of learning of the second maintenance duty value DH2 (YES in step S260), it is determined that the process of learning the maintenance duty value DH has already been executed during the reduced-cylinder operation, and the learning of the second maintenance duty value DH2 is completed. Thus, the routine ends.

When it is determined that there is no history of learning of the second maintenance duty value DH2 (NO in step S260), it is determined that the learning of the second maintenance duty value DH2 has not been performed, and the second maintenance duty value DH2 is set to a second initial maintenance value DHb2 that is the initial maintenance value DHb appropriate for the reduced-cylinder operation (S270). The second initial maintenance value DHb2 is set in advance to a value smaller than the first initial maintenance value DHb1. The second initial maintenance value DHb2 is smaller than the first initial maintenance value DHb1 for the following reason. As described above, when the reduced-cylinder operation is performed, the cam torque acting on the variable valve operating mechanism 100 is smaller than that when the all-cylinder operation is performed. Taking into account the decrease in the cam torque, and the influence of the cam torque on the setting of the initial maintenance value DHb, the optimum second initial maintenance value DHb2, which is the initial maintenance value DHb during the reduced-cylinder operation, is smaller than the first initial maintenance value DHb1, which is the initial maintenance value DHb during the all-cylinder operation.

Next, it is determined whether a condition for learning the second maintenance duty value DH2 is satisfied (S280). The learning condition is a condition for permitting a change of the second maintenance duty value DH2 from the second initial maintenance value DHb2 to the learned value DHG during the process of learning the maintenance duty value DH. When the value of the timer T exceeds the determination time TP, an affirmative determination is made.

When it is determined that the condition for learning the second maintenance duty value DH2 is not satisfied (NO in step S280), the routine ends. In this case, the second maintenance duty value DH2 is maintained at the second initial maintenance value DHb2.

When it is determined that the condition for learning the second maintenance duty value DH2 is satisfied (YES in step S280), the second maintenance duty value DH2 is changed from the second initial maintenance value DHb2 to the learned value DHG learned during the reduced-cylinder operation (S290). Then, the routine ends.

Because the processes in step S230 and step S270 are executed in the maintenance duty value setting routine, the first maintenance duty value DH1 is set to the appropriate first initial maintenance value DHb1 according to the cam torque during the all-cylinder operation, and the second maintenance duty value DH2 is set to the appropriate second initial maintenance value DHb2 according to the cam torque during the reduced-cylinder operation. Thus, before the process of learning the maintenance duty value is completed, the first maintenance duty value DH1 is set to the first initial maintenance value DHb1 that is set in advance, and thus, the first maintenance duty value DH1 is set to the appropriate value according to the cam torque during the all-cylinder operation. Also, before the process of learning the maintenance duty value is completed, the second maintenance duty value DH2 is set to the second initial maintenance value DHb2 that is set in advance, and thus, the second maintenance duty value DH2 is set to the appropriate value according to the cam torque during the reduced-cylinder operation. Thus, the first maintenance duty value DH1 and the second maintenance duty value DH2 are optimized according to the all-cylinder operation and the reduced-cylinder operation, respectively. Accordingly, when the all-cylinder operation is performed, and the drive duty value DT is set to the first maintenance duty value DH1 that is set to the first initial maintenance value DHb1, it is possible to suppress the deterioration of the control performance when the valve timing is maintained. That is, it is possible to reduce the possibility that the hunting phenomenon, in which the actual displacement angle VT oscillates, occurs, the valve timing is maintained. Similarly, when the reduced-cylinder operation is performed, and the drive duty value DT is set to the second maintenance duty value DH2 that is set to the second initial maintenance value DHb2, it is possible to suppress the deterioration of the control performance when the valve timing is maintained. That is, it is possible to reduce the possibility that the hunting phenomenon, in which the actual displacement angle VT oscillates, occurs, when the valve timing is maintained.

As described above, the maintenance duty value DH is used as the reference value when the variable valve timing control is executed. The first initial maintenance value DHb1 and the second initial maintenance value DHb2 are set as the reference values used before the learning of the maintenance duty value is completed. The first initial maintenance value DHb1 and the second initial maintenance value DHb2 are set to appropriate values according to the cam torque during the all-cylinder operation, and the cam torque during the reduced-cylinder operation, respectively. Accordingly, the reference values, which are used in the variable valve timing control before the learning of the maintenance duty value is completed, are set to the appropriate values according to the cam torque during the all-cylinder operation and the cam torque during the reduced-cylinder operation, respectively. Thus, it is possible to appropriately execute the variable valve timing control during each of the operations (that is, during each of the all-cylinder operation and the reduced-cylinder operation).

As described above, according to the embodiment, it is possible to obtain the following advantageous effects. (1) The control characteristic values, which are used to set the drive duty value DT for the hydraulic pressure control valve 120, and which are used to make the actual displacement angle VT match the target displacement angle VTp, are set in a manner such that when the reduced-cylinder operation is performed, the control characteristic values are different from the control characteristic values when the all-cylinder operation is performed. Therefore, when controlling the hydraulic pressure control valve 120 of the variable valve operating mechanism 100 provided in the engine 1 in which the all-cylinder operation and the reduced-cylinder operation are performed, it is possible to optimize the control characteristic values used to set the drive duty value DT for the hydraulic pressure control valve 120, according to each of the all-cylinder operation and the reduced-cylinder operation.

(2) The feedback control of the controlled variable for the hydraulic pressure control valve 120 is executed according to the difference $\Delta VT$ between the target displacement angle VTp and the actual displacement angle VT. The control gain used in the feedback control, which is the control characteristic value, is set in a manner such that when the reduced-cylinder operation is performed, the control gain is different from the control gain when the all-cylinder operation is performed. More specifically, the proportional gain P, which is the control gain, is set in a manner such that when the reduced-cylinder operation is performed, the proportional gain P is smaller than the proportional gain P when the all-cylinder operation is performed. Therefore, it is possible to set the control gain to appropriate values according to the cam torque during the reduced-cylinder operation, and the cam torque during the all-cylinder operation, respectively.

(3) The maintenance duty value DH is the control characteristic value, and set as the controlled variable for the hydraulic pressure control valve 120 to maintain the actual displacement angle VT at the target displacement angle VTp. The maintenance duty value DH is set in a manner such that when the reduced-cylinder operation is performed, the maintenance duty value DH is different from the maintenance duty value DH when the all-cylinder operation is performed. More specifically, when the reduced-cylinder operation is performed, the maintenance duty value DH is smaller than that when the all-cylinder operation is performed. Accordingly, it is possible to set the maintenance duty value DH to appropriate values according to the cam torque during the reduced-cylinder operation, and the cam torque during the all-cylinder operation, respectively.

(4) The maintenance duty value DH (i.e., the first maintenance duty value DH1 and the second maintenance duty value DH2) is used to maintain the actual displacement angle VT at the target displacement angle VTp. The valve timing is changed by setting the drive duty value DT so that the drive duty value DT is different from the maintenance duty value DH. In this regard, according to the embodiment, the maintenance duty value DH, which is used as the reference value for the variable valve timing control, is set to appropriate values according to the cam torque during the reduced-cylinder operation, and the cam torque during the all-cylinder operation, respectively. Therefore, it is possible to appropriately execute the variable valve timing control during each of the reduced-cylinder operation and the all-cylinder operation.

(5) The learning process is executed during each of the reduced-cylinder operation and the all-cylinder operation. In the learning process, the drive duty value DT at the time at which the valve timing is changed and the actual displacement angle VT matches the target displacement angle VTp is learned as the learned value DHG, and the maintenance duty value DH is set to the learned value DHG. The initial maintenance value DHb, which is the initial value of the maintenance duty value DH, and used before the learning process is completed, is set in a manner such that when the reduced-cylinder operation is performed, the initial maintenance value DHb is different from the initial maintenance value DHb when the all-cylinder operation is performed. Thus, before the learning process is completed, the first maintenance duty value DH1 is set to the rust initial maintenance value DHb1 that is set in advance, and the second maintenance duty value DH2 is set to the second initial maintenance value DHb2 that is set in advance. Accordingly, before the learning process is completed, the first maintenance duty value DH1 and the second maintenance duty value DH2 are set to appropriate values according to the cam torque during the all-cylinder operation, and the cam torque during the reduced-cylinder operation, respectively.

Modifications may be made to the above-described embodiment as follows. In the above-described embodiment, the initial maintenance value DHb, which is set as the maintenance duty value DH used before the process of learning the maintenance duty value DH is completed, is set in a manner such that when the reduced-cylinder operation is performed, the initial maintenance value DHb is different from the initial maintenance value DHb when the all-cylinder operation is performed. In addition, the maintenance duty value DH may be set to a preset value without executing the process of learning the maintenance duty value DH. In this case, a set value S1 for the all-cylinder operation, and a set value S2 for the reduced-cylinder operation are set. Taking into account the above-described change in the cam torque, the set value S2 for the reduced-cylinder operation is set to be smaller than the set value S1 for the all-cylinder operation. The first maintenance duty value DH1 used during the all-cylinder operation is set to the set value S1 for the all-cylinder operation. The second maintenance duty value DH2 used during the reduced-cylinder operation is set to the set value S2 for the reduced-cylinder operation. In this case as well, it is possible to obtain the above-described advantageous effects (1) to (4).

In the above-described embodiment, the first proportional gain P1 and the second proportional gain P2 are changed according to the difference $\Delta VT$. However, the first proportional gain P1 and the second proportional gain P2 may be fixed values. In this case as well, by making the second proportional gain P2 smaller than the first proportional gain P1, it is possible to obtain the above-described advantageous effects (1) to (5).

In the above-described embodiment, the proportional gain P is set in a manner such that when the reduced-cylinder operation is performed, the proportional gain P is different from the proportional gain P when the all-cylinder operation is performed. The integral gain I and/or the differential gain D may be set in a manner such that when the reduced-cylinder operation is performed, the integral gain I and/or the differential gain D are/is different from the integral gain I and/or the differential gain D when the all-cylinder operation is performed, in the same manner as the manner in which the proportional gain P is set. In modified examples, the control gain(s) described below in (a) to (f) may be set in a manner such that when the reduced-cylinder operation is performed, the control gain(s) is(are) different from the control gain(s) when the all-cylinder operation is performed.

(a) Only the integral gain I; (b) only the differential gain D; (c) the proportional gain P and the integral gain I; (d) the proportional gain P and the differential gain D; (e) the integral gain I and the differential gain D; and (f) the proportional gain P, the integral gain I, and the differential gain D.

In the above-described embodiment, the operation of the hydraulic pressure control valve 120 is controlled by executing the duty control. However, the operation of the hydraulic pressure control valve 120 may be controlled by controlling, for example, an electric current value or a voltage. In the above-described embodiment, the invention is applied to the control apparatus that executes the feedback control of the actuator of the variable valve operating mechanism 100. However, the invention may be applied to a control apparatus that executes an open-loop control. For example, values of the controlled variable for the actuator with respect to values of the above-described difference $\Delta VT$ may be set in a map, and the controlled variable may be directly set based on the difference $\Delta VT$ using the map. In this case, a map for the reduced-cylinder operation and a map for the all-cylinder operation are set so that the controlled variable set during the reduced-cylinder operation is smaller than the controlled variable set during the all-cylinder operation. In this case, the map in which the values of the controlled variable with respect to the values of the difference $\Delta VT$ are set may be regarded as the control characteristic value. The controlled variable for the actuator with respect to the difference $\Delta VT$ may be set based on a relational expression that is set in advance.

The number of the operating cylinders during the reduced-cylinder operation may be changed according to, for example, the engine operating state. For example, as the speed and the load of the engine 1 decrease, the number of the deactivated cylinders may be increased, in other words, the number of the operating cylinders may be decreased.

In the above-described embodiment, the valve characteristics of the intake valve 9 are changed by the variable valve operating mechanism 100. However, the invention may also be applied to the case where the valve characteristics of the exhaust valve 10 are changed using a similar mechanism, or the case where the valve characteristics of the intake valve 9 and the exhaust valve 10 are changed using the similar mechanism.

The invention is not limited to the variable valve operating mechanism 100 in the above-described embodiment. The invention may also be applied to a variable valve operating mechanism with the other configuration that changes the valve characteristics (for example, the opening timing, the closing timing, the valve-open period, and the maximum lift amount) of the engine valve, for example, the intake valve 9 and/or the exhaust valve 10. That is, the invention may be applied to any variable valve operating mechanism, as long as the cam torque influences the optimization of the control characteristic values for the variable valve operating mechanism.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A control apparatus for a variable valve operating mechanism, which is employed for a multi-cylinder internal combustion engine including the variable valve operating mechanism and a valve stop mechanism, wherein the variable valve operating mechanism includes a variable mechanism portion that changes a valve characteristic of an engine valve, and an actuator that drives the variable mechanism portion; and the valve stop mechanism stops opening and closing of the engine valve in at least one of cylinders, the control apparatus comprising:

a controller configured to set a controlled variable for the actuator so that an actual value of the valve characteristic matches a target value of the valve characteristic, and to set, based on whether a reduced-cylinder operation is performed or an all-cylinder operation is performed, a control characteristic value used to set the controlled variable for the actuator, and to make the actual value match the target value, in a manner such that, when the reduced-cylinder operation is performed by operating the valve stop mechanism, the control characteristic value is different from the control characteristic value when the all-cylinder operation is performed by deactivating the valve stop mechanism.

2. The control apparatus according to claim 1, wherein:
the controller executes a feedback control of the controlled variable for the actuator according to a difference between the target value and the actual value; and
the control characteristic value is a control gain used in the feedback control.

3. The control apparatus according to claim 2, wherein when the reduced-cylinder operation is performed, the control gain is smaller than the control gain when the all-cylinder operation is performed.

4. The control apparatus according to claim 1, wherein the control characteristic value is a maintenance value that is set as the controlled variable for the actuator to maintain the actual value at the target value.

5. The control apparatus according to claim 4, wherein when the reduced-cylinder operation is performed, the maintenance value is smaller than the maintenance value when the all-cylinder operation is performed.

6. The control apparatus according to claim 4, wherein the valve characteristic is changed by setting the controlled variable so that the controlled variable is different from the maintenance value.

7. The control apparatus according to claim 4, wherein:
the controller executes a learning process in which the controlled variable for the actuator at a time at which the valve characteristic is changed and the actual value matches the target value is learned as a learned value, and the maintenance value is set to the learned value, during each of the reduced-cylinder operation and the all-cylinder operation; and
the controller sets an initial value of the maintenance value used before the learning process is completed, in a manner such that when the reduced-cylinder operation is performed, the initial value is different from the initial value when the all-cylinder operation is performed.

8. The control apparatus according to claim 4, wherein:
an operation of the actuator is controlled by executing a duty control; and
the maintenance value is a maintenance duty value used to maintain the actual value at the target value.

9. A control method for a variable valve operating mechanism, which is employed for a multi-cylinder internal combustion engine including the variable valve operating mechanism and a valve stop mechanism, wherein the variable valve operating mechanism includes a variable mechanism portion that changes a valve characteristic of an engine valve, and an actuator that drives the variable mechanism portion; and the valve stop mechanism stops opening and closing of the engine valve in at least one of cylinders, the control method comprising:

determining whether a reduced-cylinder operation is performed by operating the valve stop mechanism, or an all-cylinder operation is performed by deactivating the valve stop mechanism;
setting a control characteristic value to a first value when the all-cylinder operation is performed, and setting the control characteristic value to a second value that is different from the first value when the reduced-cylinder operation is performed, wherein the control characteristic value is used to set a controlled variable for the actuator, and used to make an actual value of the valve characteristic match a target value of the valve characteristic; and
setting the controlled variable for the actuator so that the actual value matches the target value, using the set control characteristic value.

10. The control method according to claim 9, further comprising:
executing a feedback control of the controlled variable for the actuator according to a difference between the target value and the actual value, wherein the control characteristic value is a control gain used in the feedback control.

11. The control method according to claim 10, wherein the second value is smaller than the first value.

12. The control method according to claim 9, wherein the control characteristic value is a maintenance value that is set as the controlled variable for the actuator to maintain the actual value at the target value.

13. The control method according to claim 12, wherein the second value is smaller than the first value.

14. The control method according to claim 12, further comprising:
executing a learning process in which the controlled variable for the actuator at a time at which the valve characteristic is changed and the actual value matches the target value is learned as a learned value, and the maintenance value is set to the learned value, during each of the reduced-cylinder operation and the all-cylinder operation,
wherein an initial value of the maintenance value is set to a third value when the all-cylinder operation is performed, and the initial value is set to a fourth value that is different from the third value when the reduced-cylinder operation is performed.

15. The control apparatus according to claim 1, wherein the control characteristic value is selected from a first proportional gain map when the engine is operating in the all-cylinder operation, and
wherein the control characteristic value is selected from a second proportional gain map when the engine is operating in a reduced-cylinder operation.

* * * * *